B. F. DEWEES.
TROLLEY ATTACHMENT.
APPLICATION FILED JAN. 4, 1911.
1,066,385.
Patented July 1, 1913.
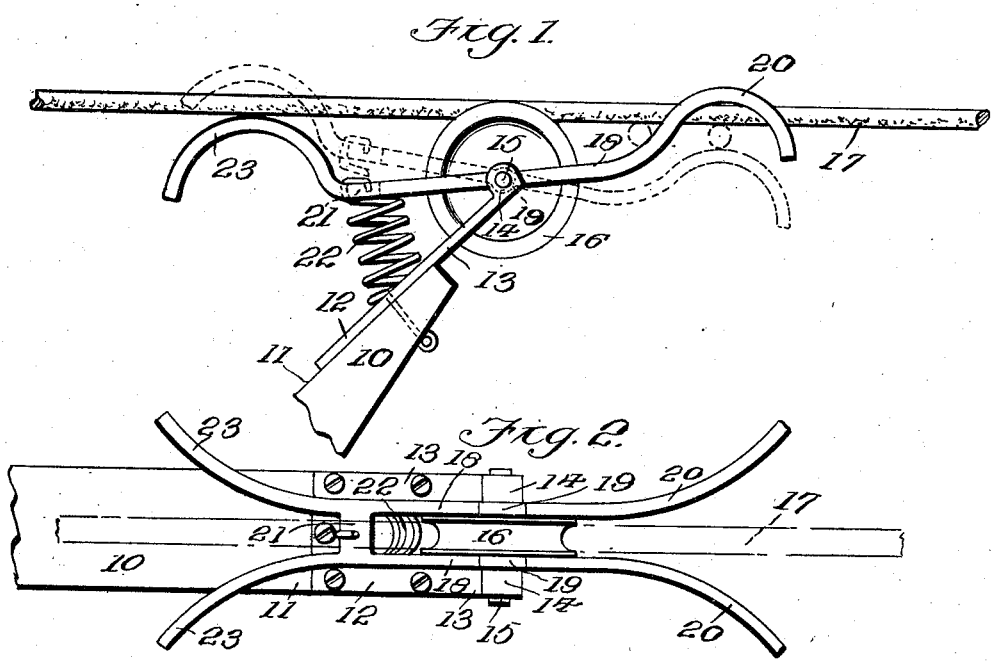

UNITED STATES PATENT OFFICE.

BENJAMIN F. DEWEES, OF LOGAN, WEST VIRGINIA, ASSIGNOR, BY MESNE ASSIGNMENTS, OF ONE-HALF TO JAMES R. HENDERSON AND JAMES B. WOODS, OF LOGAN, WEST VIRGINIA.

TROLLEY ATTACHMENT.

1,066,385.      Specification of Letters Patent.      Patented July 1, 1913.

Application filed January 4, 1911. Serial No. 600,782.

*To all whom it may concern:*

Be it known that I, BENJAMIN F. DEWEES, citizen of the United States, residing at Logan, in the county of Logan and State of West Virginia, have invented certain new and useful Improvements in Trolley Attachments, of which the following is a specification.

This invention relates to trolley harp attachments, and has for an object to provide a device for retaining the trolley wheel against the trolley wire, and for finding the wire when positioning the trolley thereagainst.

The invention has for another object to provide a device of this nature which may be readily applied to trolley harps of common form and which will positively and automatically operate to raise a pair of guiding fingers against the opposite sides of the trolley wire when the trolley wheel strikes a cross wire, or like obstruction, to retain the trolley wheel in position.

For a full understanding of the invention, reference is to be had to the following description and accompanying drawings, in which:

Figure 1 is a side elevation of a trolley harp having the improved attachment applied thereto and showing the parts in solid lines in normal positions and in dotted lines in abnormal positions. Fig. 2 is a top plan view of the same.

Corresponding and like parts are referred to in the following description and indicated in all the views of the drawing by the same reference characters.

Referring to the drawing, 10 designates a trolley pole of usual form having a flattened face 11 at its upper end receiving a trolley harp 12. The harp 12 carries fork-arms 13 enlarged at their extremities and having bearings 14. A shaft 15 is journaled in the bearings 14 to support a trolley wheel 16 between the fork-arms 13 for contact with a trolley wire 17.

The attachment or guard comprises a pair of spaced arms 18 enlarged and apertured midway of their ends, as at 19, for the reception of the shaft 15 to hingedly support the arms 18. The arms 18 are arched upwardly and are diverged at their rear ends to provide guiding fingers 20. A cross bar 21 joins the forward ends of the arms 18, and has connection with the upper end of a retractile spring 22 carried upon the harp 12. The arms 18, forwardly of the cross bar 21 are arched upwardly and diverged to provide forward guiding fingers 23.

In operation, the spring 22 normally draws the forward ends of the arms 18 down and raises the rear guiding fingers 20 above the trolley wire 17. When the trolley wheel 16 is first positioned against the wire, the fingers 20 first strike the opposite sides of the wire 17 and center the wheel 16 beneath the wire 17 as the pole 10 is raised. The forward guiding fingers 23 are thus held normally down below the wire 17, and are only brought into operation when the rear fingers 20 are inoperative.

When the trolley wheel 16 strikes a cross wire and is deflected from the main wire 17, the rear guiding fingers 20 remain above the wire and hold the trolley wheel 16 from lateral displacement from beneath the main wire. As soon as the obstruction is passed, the pole 10 carries the wheel 15 up against the wire 17. When the cross wire strikes the rear guiding fingers 20 it swings the same down against the tension of the spring 22. This operation raises the forward guiding fingers 23 above the main trolley wire 17, the fingers 23 operating to hold the trolley wheel 16 against displacement from the wire 17 during the deflection of the rear guiding fingers 20. It is thus observed that the wheel 16 is protected at all times by either the rear guiding fingers 20 or the forward guiding fingers 23 so that accidental displacement from the main wire 17 cannot take place.

Having thus described the invention, what is claimed is:

In combination with a trolley harp and a shaft and wheel journaled thereon, a device for maintaining the wheel in alinement with the wire when the wheel is passing a cross wire which is located below the current wire and when the wheel is traveling along the current wire in either of two directions, said device comprising straight arms pivoted at intermediate points upon the shaft and at the opposite sides of the wheel, said arms having at their forward and rear ends bowed portions the terminals of which extend downwardly, and a spring connected with the arms and the harp.

In testimony whereof, I affix my signature in presence of two witnesses.

BENJAMIN F. DEWEES. [L. S.]

Witnesses:
   E. H. GREENE,
   K. F. DESKIUS.

Copies of this patent may be obtained for five cents each, by addressing the "Commissioner of Patents, Washington, D. C."